United States Patent
Hammarwall et al.

(10) Patent No.: US 8,391,395 B2
(45) Date of Patent: Mar. 5, 2013

(54) PRECODER CODEBOOKS FOR EFFECTIVE CHANNELS WITH STRUCTURED FREQUENCY-SELECTIVITY

(75) Inventors: David Hammarwall, Stockholm (SE); George Jöngren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 12/960,964

(22) Filed: Dec. 6, 2010

(65) Prior Publication Data

US 2011/0243272 A1    Oct. 6, 2011

Related U.S. Application Data

(60) Provisional application No. 61/320,164, filed on Apr. 1, 2010.

(51) Int. Cl.
*H04B 7/02* (2006.01)

(52) U.S. Cl. ........ 375/267; 375/260; 375/262; 375/265; 375/340; 375/343; 375/346; 375/347; 375/350

(58) Field of Classification Search .................. 370/203, 370/204, 205, 208, 209, 210; 375/260, 262, 375/265, 267, 340, 343, 346, 347, 350
See application file for complete search history.

(56) References Cited

U.S. PATENT DOCUMENTS

| | | | | |
|---|---|---|---|---|
| 7,965,780 B2 * | 6/2011 | Lindoff et al. | ................ | 375/260 |
| 8,194,602 B2 * | 6/2012 | van Rensburg et al. | ...... | 370/329 |
| 2009/0067525 A1 | 3/2009 | Kim et al. | | |

FOREIGN PATENT DOCUMENTS

| WO | 2006020741 A2 | 2/2006 |
|---|---|---|
| WO | 2009061115 A2 | 5/2009 |

\* cited by examiner

*Primary Examiner* — Dhaval Patel
(74) *Attorney, Agent, or Firm* — Coats & Bennett, P.L.L.C.

(57) ABSTRACT

A precoder for an effective channel linking a wireless receiver to a wireless transmitter includes a precoder report and a precoder update report, the effective channel including a propagation channel, transmit filters and receive filters. A structured frequency-selectivity of the effective channel is determined, the structured frequency-selectivity being induced by one or more long term and/or persistent parameters of the effective channel. The precoder update report is generated based on the structured frequency-selectivity. The precoder update report includes frequency-dependent phase compensation which accounts for the structured frequency-selectivity. The precoder report is generated for the effective channel based on channel state information determined for the effective channel. The precoder report and the precoder update report are transmitted to the wireless transmitter. The transmitter determines a transmission operation based on the precoder report and the precoder update report, and transmits data to the wireless receiver in accordance with the transmission operation.

31 Claims, 5 Drawing Sheets

PRECODER CODEBOOKS FOR EFFECTIVE CHANNELS WITH STRUCTURED FREQUENCY-SELECTIVITY

PRIORITY CLAIM

This application claims priority to U.S. Provisional Patent Application No. 61/320,164, filed 1 Apr. 2010, said provisional application incorporated herein by reference in its entirety.

FIELD OF THE TECHNOLOGY

The embodiments described herein generally relate to wireless communication systems and multi-antenna transmissions, and particularly relate to transmission precoding.

BACKGROUND

It is well known that the use of multiple antennas at the transmitter and/or receiver may significantly boost the performance of a wireless system. Such multiple-input-multiple-output (MIMO) antenna configurations have the potential of both improving data rates and increasing diversity. Precoding is one multi-antenna technique for improving the performance of a MIMO system by transforming the information carrying transmit vector so that the vector better fits the channel conditions. This may be done based on channel information or completely without channel information or some combination thereof. Often, precoding is implemented as performing a linear transformation on the information carrying vector prior to transmission. Such linear transformation is usually represented by a matrix. Precoding is an integral part of LTE (3GPP Long Term Evolution) as well as of WCDMA (Wideband Code Division Multiple Access) and WiMax (Worldwide Interoperability for Microwave Access).

There are two basic types of precoding: codebook based and non-codebook based. Codebook based precoding involves the precoding matrix implementing the linear transformation being selected from a countable and typically finite set of candidate matrices. The set of candidate matrices constitutes the codebook. On the other hand, non-codebook based precoding does not involve any quantization. The precoding element may thus for example be a continuous function of the channel matrix.

Beamforming is a special case of the more general notion of precoding and involves a single information carrying symbol stream being multiplied by a channel dependent vector that adjusts the phase of the signal on each transmit antenna so that coherent addition of the transmit signals is obtained at the receiver side. This provides diversity as well as increases the SNR. The precoder matrix may need to be signaled, by means of feedback signaling and/or signaling of the chosen precoder element in the forward link. The feedback signaling may be viewed as a way for the receiver to provide channel information to the transmitter.

Several different approaches are known for implementing such forward link signaling. For codebook based precoding, explicit signaling of the precoder element index in the forward link is possible. The precoder may also be implicitly signaled using precoded pilots/reference symbols (RS) that together with non-precoded reference symbols may be used at the receiver to determine the used precoder element. Another possibility is to use precoded reference symbols also for the demodulation of the data, that is so-called dedicated RS or alternatively demodulation RS or UE specific RS, and absorb the precoder element into the effective channel from the perspective of the receiver.

As mentioned above, the precoder may be determined/selected with different levels of information of the propagation channel between the transmitter and the receiver. Precoder selection that does not rely on the channel state is often referred to as open-loop precoding and is particularly useful in scenarios where the channel state changes rapidly and is not possible to track with sufficient precision. In more stationary scenarios, closed-loop precoding performs significantly better, because the precoder is adaptively selected to match the state of the channel and thereby maximize the performance.

Closed-loop precoding relies on the availability of channel state information at the transmitter, which must be provided by a feedback mechanism from the receiver. Such feedback may be analogue in the form of sounding signals in the reverse link or digitally signaled over a reverse link. For example, the receiver may select or recommend a precoder (or precoders) from a precoder codebook and feed back the corresponding codebook index to the transmitter, e.g. as in Rel-8 of LTE and which is referred to as implicit feedback in some contexts. A precoder recommendation may be seen as a form of channel quantization since typically a set of channel realizations map to a certain precoding element.

For closed-loop precoding to be effective, the precoder must be well matched to the state of the effective channel, which includes transmit and receive filters, channel responses of antenna cables and the actual propagation channel. This poses a problem in wideband systems where the channel may change over the frequency band (i.e. frequency-selective channels). To match the channel it may be necessary to adaptively change the precoder over the frequency band (frequency-selective precoding), which increases the demand on the frequency resolution of the feedback of channel state information. For example, a separate precoder may have to be recommended for each sub-band, where a sub-band is a frequency segment where a precoder is deemed sufficiently well matched to the channel. Doing so typically results in a significantly larger feedback/signaling overhead.

One particular problem is when the frequency selectivity of the effective channel is much higher than in the underlying radio propagation channels, which could be caused e.g. by: non-calibrated antenna arrays; and distributed antenna systems where the propagation distance from each site to the receiver (or transmitter) is significantly different. In such cases, traditional precoder selection/recommendation should be performed on a significantly higher frequency density than is strictly required by the underlying propagation environment. This is particularly clear in the common case of propagation channels with correlation, for which a single wideband precoder may be sufficient also in frequency selective channels, because the precoder may be tuned to match the statistics of the propagation channel, which may be valid over a significantly wider bandwidth than the coherence bandwidth of the propagation-channel. However, if the antennas and transmit radio chains for example are non-calibrated, the correlation of the propagation channel is not preserved in the effective channel. Instead the statistics of the effective channel change over frequency, requiring frequency selective precoder feedback. Alternatively, the antennas must be calibrated with an associated increase in system cost.

For a system with non-calibrated antennas, let $H_{RP}(f)$ denote the frequency response of the radio-propagation channel. The effective channel may then be modeled as $H_{eff}(f)=H_{Rx}(f)H_{RP}(f)H_{Tx}(f)$ where $H_{Rx}(f)$, where $H_{Tx}(f)$ are the frequency responses of the receiver and the transmitter respectively. Generally, the frequency selectivity induced by the receiving antennas and filters, $H_{Rx}(f)$, may be accounted for as part of the receive processing because the channel knowledge at the receiver is typically much better than at the transmitter. Moreover $H_{Tx}(f)$ typically do not fade over frequency (i.e. the gains do not change) but rather induce phase rotations, which in addition are rather stable over time.

Mismatched transmit antennas and filters are however more problematic because the mismatch causes fast variations in $H_{Tx}(f)$, which is problematic for channel dependent closed loop precoding, where the received signal, y(f), may be modeled as $y(f) = H_{eff}(f)W(f)x(f)$ with $x(f)$ being the modulated information carrying symbols. For the precoding to match the effective channel, the frequency-selectivity of the precoder must match the frequency-selectivity of the effective channel.

A common model for the impulse response of the transmitter, which models the transmit delays of each transmit (TX) antenna, is given by $H_{Tx}(\tau) = \mathrm{diag}(\alpha_1 \delta(\tau - \tau_1), \ldots, \alpha_{N_{Tx}} \delta(\tau - \tau_{N_{Tx}}))$ which corresponds to the frequency response $$H_{Tx}(f) \propto \mathrm{diag}(\alpha_1 e^{-j2\pi\tau_1 f}, \ldots, \alpha_{N_{Tx}} e^{-j2\pi\tau_{N_{Tx}} f}).$$

That is, compared to a calibrated array, having $\tau_1 = \tau_2 = \ldots = \tau_{N_{Tx}} = 0$, the effective channel is related as given by:

$$H_{eff}(f) = H_{eff}^{calibrated}(f) \cdot \mathrm{diag}(e^{-j2\pi\tau_1 f}, \ldots, e^{-j2\pi\tau_{N_{Tx}} f}) \quad (1)$$

As such, the relative phase between the TX antennas is rotated over frequency. For example, the relative phase between antenna m and n is rotated by the phase $2\pi(\tau_n - \tau_m)f$. If the bandwidth B is larger or same order of magnitude as $$\frac{1}{2\pi\Delta\tau_{max}}, \text{ where } \Delta\tau_{max} = \max_{m,n}|\tau_m - \tau_n|,$$

then there is a significant phase rotation within the band. That is, if the maximum tolerated relative phase rotation in a subband is x radians, then the subband bandwidth, $B_{SB}$, is upper bounded as:

$$B_{SB} \leq \frac{x}{2\pi\Delta\tau_{max}} \quad (2)$$

Accordingly, for traditional precoding/beamforming, the subband bandwidth in which a precoder is valid is upper bounded in accordance with equation (2). This is in particular restricting for wideband precoding that is matched to the statistics of the channel $R_{eff,Tx}(f) = E\{H_{eff}^H(f)H_{eff}(f)\} \approx H_{Tx}^H(f)E\{H_{RP}^H(f)H_{RP}(f)\}H_{Tx}(f)$. It is well known that the statistics of the radio propagation channel are well approximated as constant over the bandwidth $R_{Tx,RP} = E\{H_{RP}^H(f)H_{RP}(f)\}$, and the frequency selectivity of the transmit covariance matrix of the effective channel $R_{eff,Tx}(f) = H_{Tx}^H(f)R_{Tx,RP}H_{Tx}(f)$ is thereby more or less completely induced by frequency response of the transmit filters and antennas, $H_{Tx}(f)$. In other words, with perfectly calibrated antennas, a precoder/beamformer tuned to the channel statistics is valid over the entire bandwidth, which is highly useful in correlated channel environments. With non-calibrated antennas, the precoder is only valid on subbands of bandwidths limited as given by equation (2).

For a system with multi-site coherent joint transmission, the propagation time difference between the terminal and the different sites may be substantially different. Such propagation time differences may have a severe adverse impact on the subband size in which a precoder is valid, much in the same way that non-calibrated antenna arrays affect the frequency selectivity. Let $H_k(\tau)$ be the effective channel impulse response, not including the propagation delay, to the k:th site, and let $\tau_k$ be the propagation delay. The compound channel impulse response, including propagation delays, may then be written as $H_{compound}(\tau) = [H_1(\tau - \tau_1) \ldots H_N(\tau - \tau_N)]$. The frequency response is readily obtained as:

$$H_{compound}(f) = [e^{-j2\pi\tau_1 f}H_1(f), \ldots, e^{-j2\pi\tau_N f}H_N(f)] \quad (3)$$

and it is observed that the subband in which a precoder operating on the compound channel is again limited by equation (2).

SUMMARY

In one or more embodiments, a first device computes/selects a precoder report and signals the precoder report to a second device. The precoder report is augmented by a frequency-dependent precoder frequency update report. The precoder frequency update report is an integral part of the precoder report in that the frequency update report is used to determine the reported precoding operation from the precoding report. The precoder frequency-update report targets structured frequency-selectivity induced by long-term/persistent parameters in the radio hardware, deployment, and/or propagation channel. Because of the characteristics of such structured frequency-selectivity, the overhead for the precoder frequency update report may be kept low. The term "precoder report" as used in this specification should be interpreted in the general sense of a precoder message that may be, for example, a recommended, requested, selected or configured precoding operation. Thus the report is not necessarily only informative.

According to an embodiment of a method in a network node of generating a precoder for an effective channel linking a wireless receiver to a wireless transmitter, the method includes determining a structured frequency-selectivity of the effective channel which includes a propagation channel, transmit filters and receive filters. The structured frequency-selectivity is induced by one or more long term and/or persistent parameters of the effective channel. The method also includes generating a precoder update report based on the structured frequency-selectivity, the precoder update report including frequency-dependent phase compensation which accounts for the structured frequency-selectivity, generating a precoder report for the effective channel based on channel state information determined for the effective channel, and transmitting the precoder report and the precoder update report to the wireless transmitter.

According to an embodiment of a network node, the network node includes a signal quality estimator circuit, a precoding generator circuit and a transceiver circuit. The signal quality estimator circuit is operable to determine channel state information for an effective channel linking a wireless receiver to a wireless transmitter, the effective channel including a propagation channel, transmit filters and receive filters. The signal quality estimator circuit is further operable to determine a structured frequency-selectivity of the effective channel. The structured frequency-selectivity is induced by one or more long term and/or persistent parameters of the effective channel. The precoding generator circuit is operable to generate a precoder report for the effective channel based on the channel state information, and a precoder update report based on the structured frequency-selectivity. The precoder update report includes frequency-dependent phase compensation that accounts for the structured frequency-selectivity. The transceiver circuit is operable to transmit the precoder report and the precoder update report to the wireless transmitter.

According to another embodiment, a wireless transmitter is linked to a wireless receiver via an effective channel that includes a propagation channel, transmit filters and receive filters. The wireless transmitter includes a transceiver circuit and a precoding processor circuit. The transceiver circuit is operable to receive a precoder report and a precoder update report for the effective channel. The precoder report is based on channel state information for the effective channel and the precoder update report is based on a structured frequency-selectivity of the effective channel which is induced by one or more long term and/or persistent parameters of the effective channel. The precoder update report includes frequency-dependent phase compensation that accounts for the structured frequency-selectivity. The precoding processor circuit is operable to determine a transmission operation based on the precoder report and the precoder update report, and transmit data to the wireless receiver in accordance with the transmission operation.

According to an embodiment of a method in a wireless transmitter of transmitting data to a wireless receiver over an effective channel including a propagation channel, transmit filters and receive filters, the method includes receiving a precoder report and a precoder update report for the effective channel. The precoder report is based on channel state information for the effective channel and the precoder update report is based on a structured frequency-selectivity of the effective channel which is induced by one or more long term and/or persistent parameters of the effective channel. The precoder update report includes frequency-dependent phase compensation that accounts for the structured frequency-selectivity. The method further includes determining a transmission operation based on the precoder report and the precoder update report and transmitting data to the wireless receiver in accordance with the transmission operation.

The precoder frequency update report described herein reduces precoder performance degradation caused by structured frequency-selectivity in the effective channel imposed by, for example, non-calibrated antenna arrays and multi-site joint transmission. Since the precoder frequency update report is included as part of the precoding report and not, e.g., considered to be an independent quantity, the network node is automatically mandated to take the structured frequency-selectivity compensation into account when determining the precoder feedback. Thus, the precoder feedback may remain efficient even if the network node experiences channels with large differences in e.g., time shifts.

Of course, the embodiments described herein are not limited to the features and contexts summarized above, and those familiar with precoding techniques will recognize additional features and contexts upon reading the following detailed description and upon viewing the accompanying drawings.

BRIEF DESCRIPTION OF THE DRAWINGS

The components in the figures are not necessarily to scale, instead emphasis being placed upon illustrating the principles of the embodiments described herein. Moreover, in the figures, like reference numerals designate corresponding parts. In the drawings.

DETAILED DESCRIPTION

While this specification uses LTE networks and terminology for an example context, the embodiments described herein are equally applicable to other systems, including but not limited to WCDMA, CDMA, WiMax, UMB (Ultra Mobile Broadband), etc.

Structured frequency-selectivity in an effective channel may be induced by many factors and deployment scenarios, such as for non-calibrated transmit antennas and/or for multi-site joint transmission. The embodiments described herein account for such frequency selectivity via a small or moderate feedback overhead.

Figure 1:
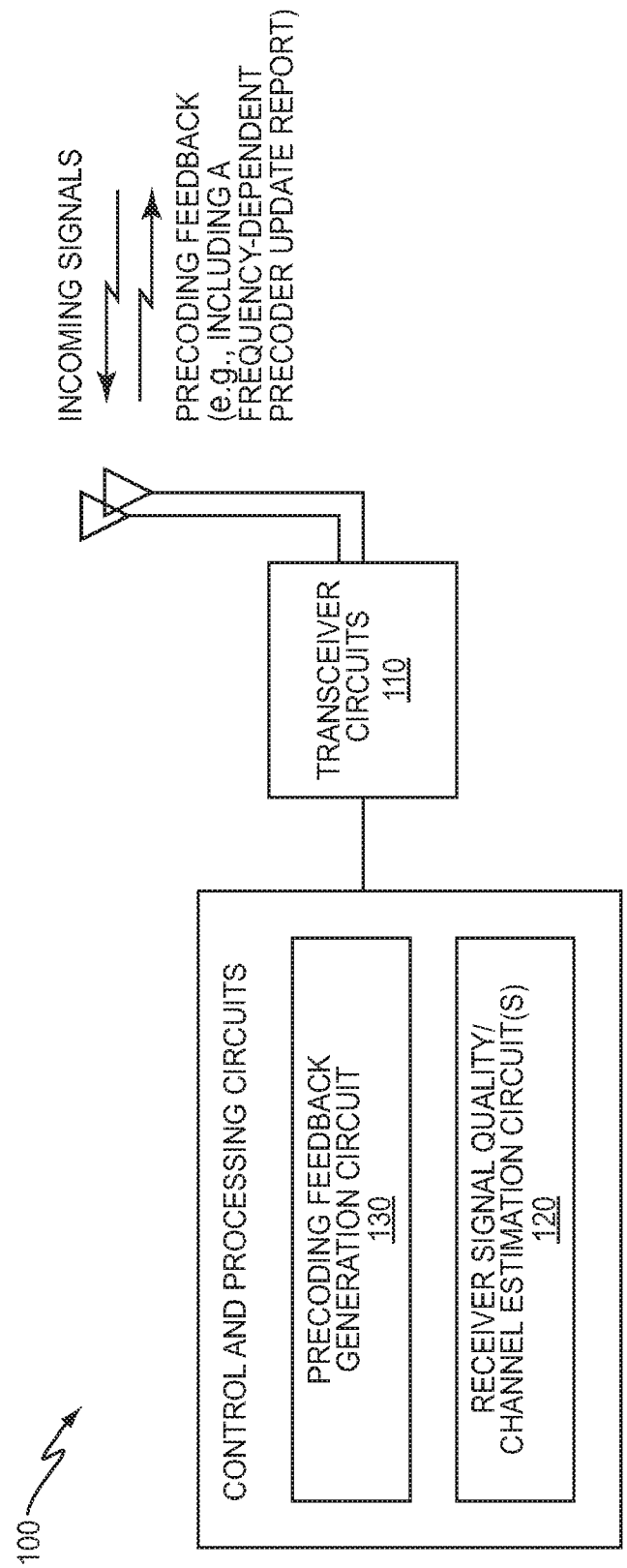
FIG. 1 illustrates an embodiment of a network node that generates a precoder report and a precoder update report for an effective channel.

FIG. 1 illustrates an embodiment of a network node 100 that communicates with another node of a network over an effective channel that includes the actual propagation channel, transmit filters and receive filters. For example, the network node 100 may be a wireless receiver or an intermediary node in a network coupled between a wireless transmitter and a wireless receiver. The network node 100 includes transceiver circuits 110 for receiving and transmitting signals. Part of the outgoing signal transmissions includes a precoder report and a precoder update report generated by the network node 100 for the effective channel.

Figure 2:
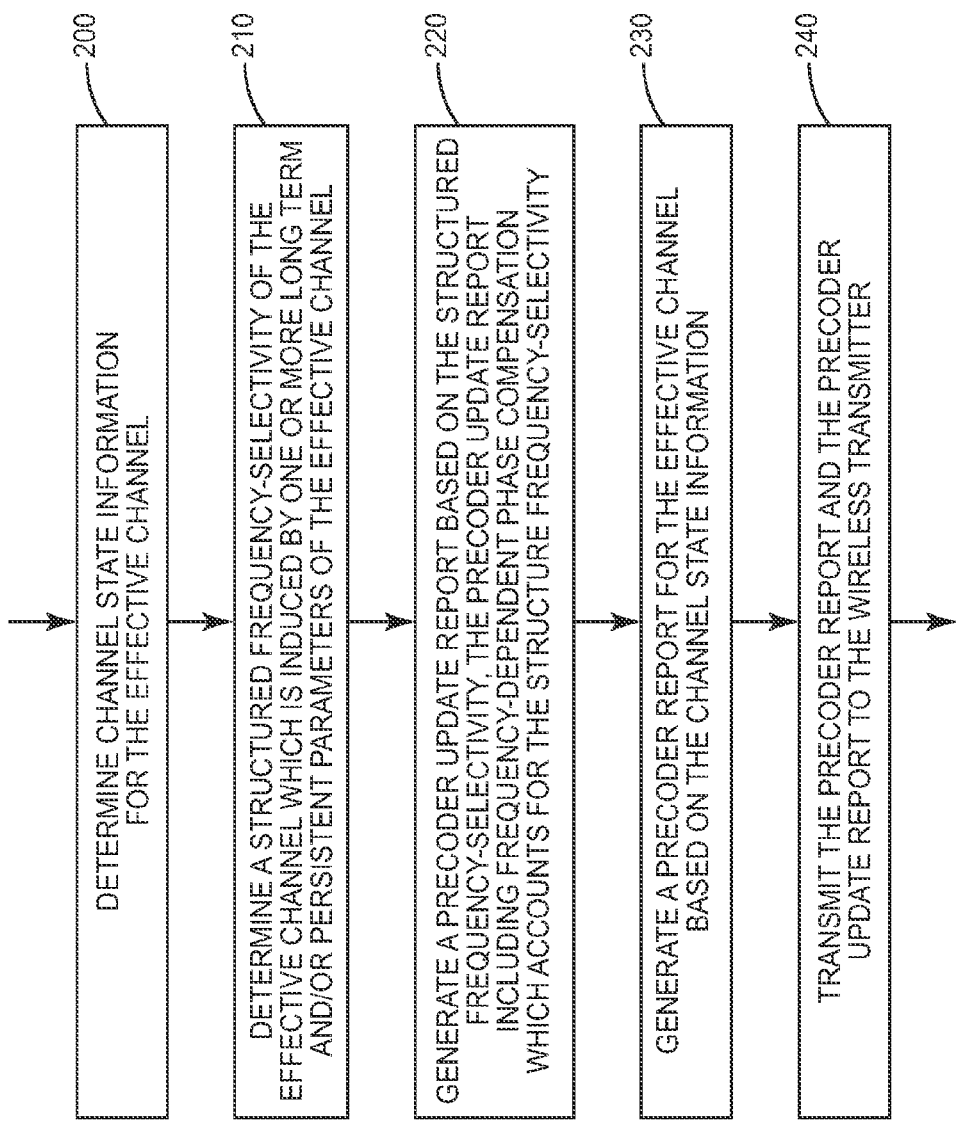
FIG. 2 illustrates an embodiment of a method for generating a precoder report and a precoder update report for an effective channel.

Operation of the network node 100 is described next in more detail with reference to FIG. 2. No particular order should be implied by the steps illustrated in FIG. 2. That is, one or more earlier identified steps may be performed later in the process and one or more later identified steps may be performed earlier. The network node 100 includes signal quality/channel estimation circuit(s) 120 that determines channel state information for the effective channel e.g. by modeling the effective channel as $H_{eff}(f)=H_{Rx}(f)H_{RP}(f)H_{Tx}(f)$, where $H_{Rx}(f)$ and $H_{Tx}(f)$ are the frequency responses of the wireless receiver and the wireless transmitter, respectively (Step 200). The signal quality/channel estimation circuit(s) 120 also determines a structured frequency-selectivity of the effective channel (Step 210). The structured frequency-selectivity is induced by one or more long term and/or persistent parameters of the effective channel.

The network node 100 also includes a precoding feedback generation circuit 130 that generates a precoder update report based on the structured frequency-selectivity (Step 220) and a precoder report for the effective channel based on the channel state information (Step 230). The precoder update report includes frequency-dependent phase compensation that accounts for the structured frequency-selectivity of the effective channel. The transceiver circuits 110 transmit the precoder report and the precoder update report to the wireless transmitter (Step 240).

In one embodiment, the precoder report and the precoder update report are generated for an OFDM system with reporting for wideband precoding. Traditionally the reported precoder is static for all subcarriers, and the reported precoder of subcarrier k, $W_k$, is simply given by:

$$W_k = W^{(W)} \quad (4)$$

where $W^{(W)}$ is the reported wideband precoder, typically belonging to a precoder codebook i.e. an enumerated finite set of precoder matrices. According to one embodiment, the network node 100 augments the wideband precoder with the frequency-dependent precoder update report, $\Lambda_{n_{us}}$, where $n_{us}$ denotes the index of the frequency update subband.

The precoder of each subcarrier is then derived by combining the wideband precoder and the precoder frequency update report. In a further embodiment, the precoder reported for subcarrier k is obtained by combining the wideband precoder and the frequency update report as given by:

$$W_k = \Lambda_{n_{us}(k)} W^{(W)} \quad (5)$$

where $n_{us}(k)$ denotes the frequency update subband to which subcarrier k belongs.

In a further embodiment, the precoder frequency-update report is given by a diagonal matrix:

$$\Lambda_{s_u} = \begin{bmatrix} e^{j\omega_1 s_u} & & 0 \\ & \ddots & \\ 0 & & e^{j\omega_{N_{Tx}} s_u} \end{bmatrix} \quad (6)$$

and is parameterized by $\omega_1, \ldots, \omega_{N_{Tx}}$. That is, the frequency update report for all frequency update subbands is fully determined by $\omega_1, \ldots, \omega_{N_{Tx}}$. The reported precoder for each subcarrier is thus fully determined by $\omega_1, \ldots, \omega_{N_{Tx}}$ and $W^{(W)}$.

The reported precoder of all subcarriers may then be matched to the effective channel of, for example, a non-calibrated transmit (TX) antenna array, e.g. based on equation (1), by setting:

$$\omega_m = 2\pi \tau_m \Delta_f n_{us} \quad (7)$$

where $\Delta_f$ is the bandwidth (in Hz) of the frequency update subband. With this setting the phase rotation over frequency, induced by the non-calibrated arrays, is reduced. Similarly, the propagation delay difference in a multi-site coherent transmission, e.g. based on equation (3), may be accounted for. By setting the bandwidth of the frequency update subband to correspond to the subcarrier spacing, the network node 100 may signal a precoder report that fully compensates for the propagation delay difference. Correspondingly, larger bandwidths of the frequency update subband means there are still residual calibration errors after compensation, although they are smaller than without compensation.

A common linearly increasing phase rotation over frequency for all TX antennas does not affect the performance unless the rotation is so large that the synchronization functionality of the wireless receiver cannot cope with the phase rotation. Therefore, $\tau_m$ in equation (7) may be chosen as the relative time difference to a common reference e.g., relative to the average time difference, or relative to the delay of a reference antenna, m, in which case $\omega_m = 0$. The reference may be relative to the first antenna, and thus it always holds that $\omega_1 = 0$, meaning that this value does not need to be signaled in the report. Such relative phase compensation is generally applicable in the various embodiments described herein. Accordingly, the phases do not need to be absolute, and may be relative to some reference antenna. Also, the precoder frequency update report may be viewed as a differential encoding of the precoder over frequency with a special structure.

In one embodiment, the precoders of frequency update subband m+1 are related to the precoders of frequency update subband m as given by:

$$W^{(m+1)} = \Lambda' W^{(m)}, \text{ where } \Lambda' = \begin{bmatrix} e^{j\omega_1} & & 0 \\ & \ddots & \\ 0 & & e^{j\omega_{N_{Tx}}} \end{bmatrix} \quad (8)$$

That is, the precoder frequency update may be viewed as a differential encoding, where the same update is applied for all subbands Furthermore, the frequency-update report may be applied as a filter in the time domain. In particular, if OFDM is used, the filter may be implemented using cyclic convolution. In the simplest case, the filter reduces to a cyclic shift in time.

In a further embodiment, the precoders for each subcarrier $\omega_m$ are quantized uniformly in a pre-determined or configured range, or alternatively selected from a codebook allowing for e.g., a non-uniform quantization. For example, in systems with coarse antenna calibration, the performance (or overhead) may be improved by having a higher quantization resolution about $\omega=0$. The quantized frequency update report together with the quantized wideband precoder selected from a codebook constitutes the precoding report.

The precoder report and the precoder update report may also be generated for an OFDM system with frequency-selective subband based precoding. Traditionally, subband based precoding is conducted by reporting a separate precoder for each precoder subband which is possibly differentially encoded, and the reported precoder for subcarrier k, $W_k$, is given by:

$$W_k = W_{n_{ps}(k)}^{(S)} \quad (9)$$

where $W_{n_{ps}}^{(S)}$ is the precoder report for subband $n_{ps}$ and $n_{ps}(k)$ denotes the subband to which subcarrier k belongs. Similarly as for wideband precoder reports, subband based precoding may be augmented by a frequency dependent precoder update report, and in this embodiment the precoder reported for subcarrier k, $W_k$, is instead obtained as given by:

$$W_k = \Lambda_{n_{us}(k)} W_{n_{ps}}^{(S)} \quad (10)$$

The bandwidth of the frequency update subband is typically, but not necessarily, smaller than the bandwidth of subband of the precoder. The precoders for each subband, together with the precoder frequency update report constitute the precoder report.

In some embodiments, the precoder frequency update report may have a finite alphabet. A finite compensation alphabet may be desirable to simplify the implementation of the precoding by avoiding floating point operations needed for high precision arithmetic. In one embodiment, if the phase compensation is constrained to the set $I=\{\phi_1, \ldots, \phi_{|I|}\}$ then the precoder frequency update matrix may be set to:

$$\Lambda_k = \text{diag}\left(e^{j[\omega_1 k]_I}, e^{j[\omega_2 k]_I}, \ldots, e^{j[\omega_{N_T} k]_I}\right) \quad (11)$$

where $[\phi]_I$ denotes the element in $I$ that is closest to $\phi$, taking modulo $2\pi$ arithmetic into account. That is, $$[\phi]_I = \underset{\hat{\phi} \in I}{\operatorname{argmin}}\left(\left|(\phi - \hat{\phi}) \operatorname{mod}(-\pi, \pi)\right|\right)$$

where $\operatorname{mod}(-\pi,\pi)$ is the modulo $2\pi$ wrapping to the interval $(-\pi,\pi]$.

In another embodiment, the alphabet may be varied over frequency, e.g., by differentially encoding the linearly increasing phase over frequency. In more detail, the phase function of antenna n is given by $\theta_k^{(n)}=\omega_n k$. The phase function may be used to form a precoder frequency update matrix as given by:

$$\Lambda_k = \operatorname{diag}\left(e^{j\hat{\theta}_k^{(1)}}, e^{j\hat{\theta}_k^{(2)}}, \ldots, e^{j\hat{\theta}_k^{(N_T)}}\right) \quad (12)$$

$$\hat{\theta}_{k+1}^{(n)} = \hat{\theta}_k^{(n)} + \Delta_k$$

$$\Delta_k = \underset{\Delta \in I}{\operatorname{argmin}}\left((\theta_{k+1}^{(n)} - \hat{\theta}_k^{(n)} - \Delta)\operatorname{mod}(-\pi, \pi)\right)$$

$$I = \{\Delta_1, \Delta_2, \ldots, \Delta_{[I]}\}$$

The linearly increasing phase is tracked by selecting a phase offset relative to the phase of the previous frequency update subband. Further refinements of this embodiment include adapting the set of offsets to how well the phase variation is tracked. Whenever the most negative or most positive offset element in the set is chosen for two consecutive frequency update subbands, the spacing of the offsets could be enlarged. If the two offsets with the smallest absolute values are chosen in an alternating manner, the spacing could be reduced.

In another embodiment, the precoder frequency update report is restricted to a subset of the antennas A. In one such embodiment the precoder frequency update report is given by a diagonal matrix $\Lambda_{n_{us}}$, having diagonal elements given by:

$$[\Lambda_{n_{us}}]_{mm} = \begin{cases} e^{j\omega_m s_u}, & m \in A \\ 1 & m \notin A. \end{cases} \quad (13)$$

In this case, only $\omega_m$, $m \in A$ precoder frequency update reports are reported. This is advantageous, for example, when only a subset of the antennas is non-calibrated or show significant phase rotations over frequency.

In a special case A only includes a single antenna index, corresponding to robust relative frequency rotations between that antenna and any other antenna of choice. This may be useful in eliminating the impact of the frequency rotations on the most ill calibrated antenna. The set A may either be part of the precoder report and thus be dynamically selected, or be persistently or semi-statically configured by a terminal or some other node in the network.

The precoder report and the precoder update report may also be generated for multi-site joint transmission environments. In case the individual arrays of each site are calibrated individually, it is sufficient to match the precoder frequency update report to account for the different propagation delay of the sites. In one embodiment, the precoder frequency update report utilizes the following structure:

$$\Lambda_{s_u} = \begin{bmatrix} e^{j\omega_1 s_u} I_{N_{Tx,1}} & & 0 \\ & \ddots & \\ 0 & & e^{j\omega_{N_{sites}} s_u} I_{N_{Tx,N_{sites}}} \end{bmatrix} \quad (14)$$

where $N_{sites}$ is the number of participating sites, and $I_{N_{Tx,m}}$ is an identity matrix with a size corresponding to the number of transmit (TX) antennas at site m. This structure eliminates the frequency rotations described in equation (3), yet only a single parameter per size as opposed to one per antenna is used.

In yet another embodiment, the precoder frequency update report is combined with a multi-granular precoder report. Multi-granular codebooks utilize wideband correlation structures of the channel to achieve better resolution in the precoder reports. By decomposing the precoder in factors, each factor may be updated over frequency with a different granularity which is matched to the frequency selectivity of the channel property targeted by each factor. As such, wideband characteristics showing little frequency selectivity may be reported with a very course granularity.

However, for multi-granular designs to be effective there must be wideband characteristics in the effective channel. Multi-granular codebooks therefore are particularly suitable to be augmented by a precoder frequency update. The precoded channel with a precoder frequency update may be expressed as:

$$H_k W_k = H_k \Lambda_{n_{us}(k)} W_{n_{ps}(k)}^{(MG)} = H_k^{(total)} W_{n_{ps}(k)}^{(MG)} \quad (15)$$

where $H_k$ is the effective channel of subcarrier k and $W_{n_{ps}(k)}^{(MG)}$ is the precoder from the multi-granular precoder codebook. Accordingly, it is as if the multi-granular precoder is matched to a total channel $H_k^{(total)}$ in which the precoder frequency update has been absorbed. That is, a total channel where the structured frequency-selectivity, induced by e.g., non-calibrated arrays, has been eliminated. This enables the multi-granular codebooks to be adapted for the wideband statistics of the radio propagation channel. An equivalent interpretation is to view the precoder frequency update report as one of the factors of the multi-granular codebook with the special structure described previously herein.

The precoder report augmented with the precoder frequency update report may be combined with a channel quality indicator (CQI) report to signal the largest transport format i.e., the number of information bits and modulation that may be supported by the channel given that the precoder report and precoder frequency update report are implemented at the wireless transmitter. Thus, the precoder frequency update report is taken into account when CQI is computed, which illustrates the benefits of compensating the structured frequency-selectivity as part of the precoder feed back to the wireless transmitter. Removing the degrading effects of structured frequency-selectivity in this way enables the network node 100 to recommend a higher transmission format to the wireless transmitter.

In one embodiment, the precoding feedback generation circuit 130 of the network node 100 searches a codebook for a precoder that accounts for the precoder update report and most closely matches a channel response of the effective channel, the channel response accounting for the precoder update report. The signal quality/channel estimation circuit(s) 120 of the network node 100 calculates a channel quality matrix for the effective channel and determines a new channel quality estimate based on the channel quality matrix and the precoder. The transceiver circuits 110 of the network node 100 send the new channel quality estimate to the wireless transmitter.

Figure 3:
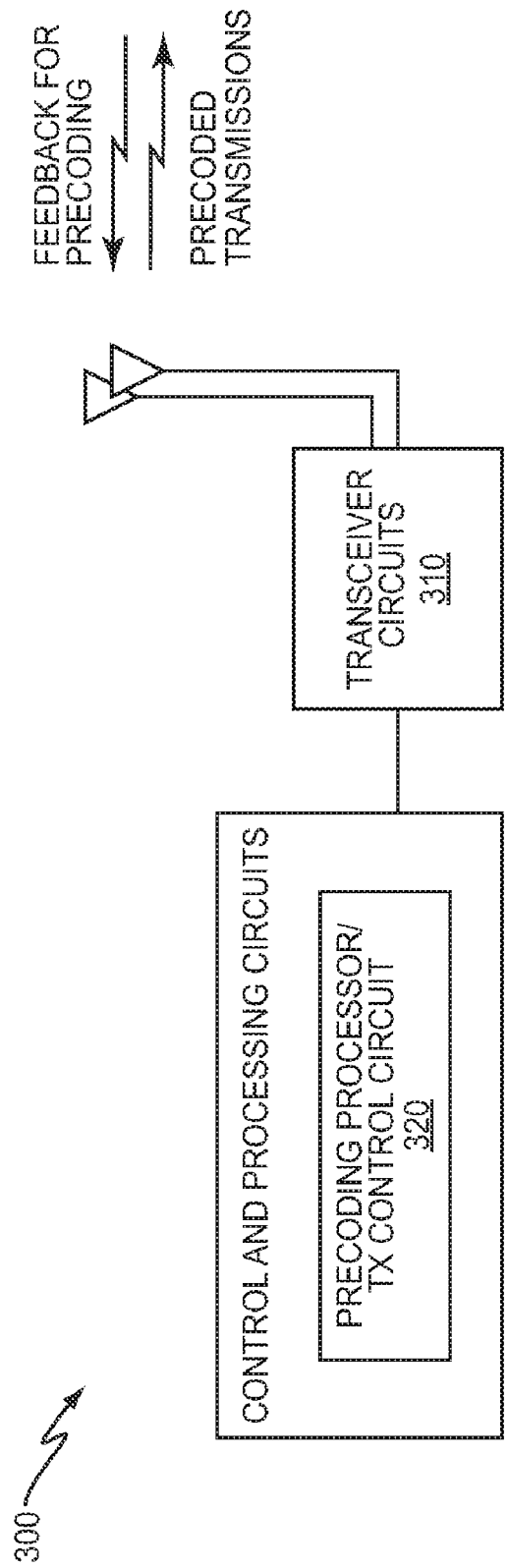
FIG. 3 illustrates an embodiment of a wireless transmitter that applies a precoder report and a precoder update report for an effective channel to transmissions sent to a wireless receiver over the effective channel.

FIG. 3 illustrates an embodiment of a network node 300 such as a base station in communication with the network node 100. The network node 300 includes transceiver circuits for receiving and transmitting signals. The network node 300 is linked to the network node 100 e.g. such as a wireless receiver via the effective channel.

Figure 4:
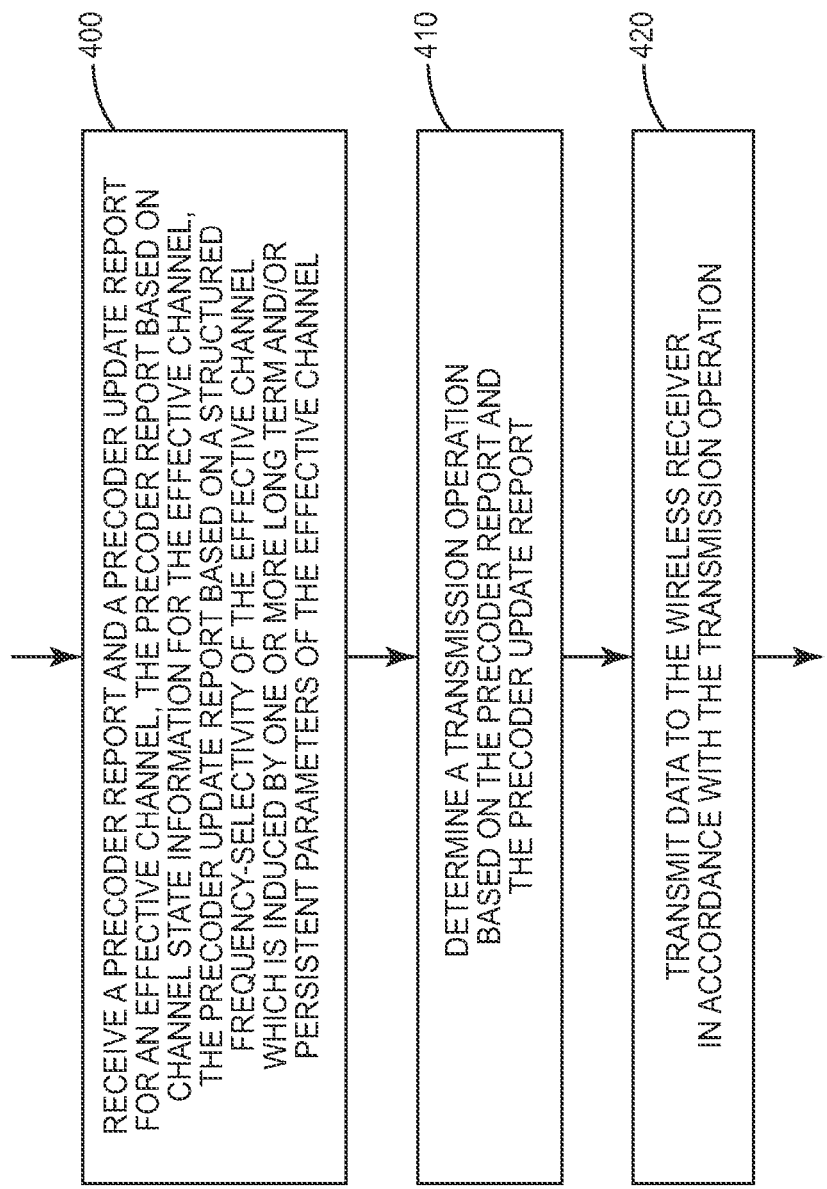
FIG. 4 illustrates an embodiment of a method for applying a precoder report and a precoder update report for an effective channel to transmissions sent to a wireless receiver over the effective channel.

Operation of the network node 300 is described next with reference to FIG. 4. The transceiver circuits 310 of the network node 300 receive the precoder report and the precoder update report for the effective channel from the network node 100 (Step 400). The precoder report is based on channel state information for the effective channel and the precoder update report is based on a structured frequency-selectivity of the effective channel as previously described herein. A precoding processor/TX control circuit 320 of the network node 300 determines a transmission operation based on the precoder report and the precoder update report (Step 410) and transmits data to the wireless receiver in accordance with the transmission operation (Step 420). This way, new precoders may be used for transmission which are based on both the precoder report and the precoder update report.

In one embodiment, the transceiver circuits 310 of the network node 300 receive channel quality information (CQI) for the effective channel. The CQI indicates the largest transport format supportable by the effective channel if the precoder report and the precoder update report are implemented at the network node 300. The precoding processor/TX control circuit 320 of the network node 300 implements the transport format indicated by the CQI for transmissions sent to the wireless receiver.

The precoder frequency update report described herein reduces precoder performance degradation caused by structured frequency-selectivity in the effective channel imposed by, for example, non-calibrated antenna arrays and multi-site joint transmission. Since the precoder frequency update report is included as part of the precoding report and not, e.g., considered to be an independent quantity, the network node 100 is automatically mandated to take the structured frequency-selectivity compensation into account when determining the precoder feedback. Thus, the precoder feedback may remain efficient even if the network node 100 experiences channels with large differences in e.g., time shifts.

Similarly, other feedback signals that depend on the reported precoder, e.g. CQI, may take the time shift compensation into account, thereby raising the efficiency of the other feedback signals. In addition, there is support for feedback generating device specific compensation while at the same time ensuring that the devices take the compensation into account in other relevant parts of the feedback reporting, as previously described herein.

For wideband precoding the benefit is particularly pronounced, since a wideband precoder report augmented with a precoder frequency update report matches the underlying wideband statistics of the radio-propagation channel, even if structured frequency-selectivity has obfuscated the wideband characteristic in the effective channel. Also, structured frequency-selectivity may impose significant phase rotations over frequency within the coherence bandwidth of the underlying radio-propagation channel. By augmenting the precoder report with a frequency update report, the bandwidth in which a precoder report coherently matches the effective channel may be extended to the coherence bandwidth of the underlying radio propagation channel.

Similar to what was previously described for wideband precoding, augmenting a precoder report with a precoder frequency update report may extend the subband bandwidth in which a reported subband precoder is able to coherently match the effective channel. The subband bandwidth may ideally be extended to match the coherence bandwidth of the underlying radio propagation channel. As such, fewer subbands may be used to cover the same bandwidth. This results in reduced overhead, or alternatively increased precoder resolution for each subband. Reduced overhead reporting results in the precoder frequency update using fewer overhead bits, while still allowing for elimination of the most degrading structured frequency-selectivity.

Different ones of the embodiments described herein may be used in combination with multi-granular precoder codebooks that take explicit use of the characteristics in the underlying radio-propagation channel. If there is structured frequency-selectivity, the underlying characteristics of the radio-propagation channel are obfuscated in the effective channel. The precoder frequency update report eliminates the structured frequency-selectivity, enabling the multi-granular codebook to operate effectively in the presence of structured frequency-selectivity.

One or more of the embodiments previously described herein may be implemented in first and second apparatuses, as where a first wireless communication apparatus transmits precoded signals to a second wireless communication apparatus. Such precoding is based at least in part on precoding feedback from the second wireless communication apparatus, according to the teachings presented herein. That is, in at least one embodiment, the second wireless communication apparatus provides frequency-dependent precoder update reports.

As a non-limiting example, the first wireless communication apparatus comprises an eNB (evolved Node B) in an LTE network, and the second wireless communication apparatus comprises a compatible LTE handset, or other portable communication device. As noted, however, the teachings presented herein are not limited to LTE/LTE-Advanced contexts. An example diagram of the first wireless communication apparatus is shown in FIG. 3. Those of ordinary skill in the art will appreciate that the exemplary first apparatus may well include elements not shown in the illustration of FIG. 3—e.g., additional communication interfaces, such as for communicating with other peer and/or higher level apparatuses. Those of ordinary skill in the art will further appreciate that the apparatus may be implemented using fixed or programmable circuitry. In one embodiment, the apparatus includes one or more microprocessors, digital signal processors, or other digital processing circuits, along with associated program and data memory.

For example, in the illustration of FIG. 3, the apparatus comprises one or more processing circuits that are configured to implement transmission precoding as taught herein, and those one or more processing circuits—e.g., control and processing circuits, including the illustrated precoding processor/TX control circuit 320—may be at least partly implemented using programmable digital processing circuits. In a particular example, the processing circuits of the apparatus are configured to implement the transmit precoding control methods taught herein, based on the execution of stored computer program instructions. In that regard, it will be appreciated that these processing circuits are specially adapted or otherwise configured to carry out the processing disclosed herein, irrespective of whether they comprise fixed or programmable circuitry, or any mix thereof.

A non-limiting example of the second apparatus is shown in FIG. 1. The second apparatus is configured to send precoding feedback according to the teachings herein. Those of ordinary skill in the art will appreciate that the example second apparatus may well include elements not shown in the illustration of FIG. 1—e.g., additional communication interfaces for peripherals, user interface circuitry, etc. Those of ordinary skill in the art will further appreciate that the apparatus may be implemented using fixed or programmable circuitry. In one embodiment, the apparatus includes one or more microprocessors, digital signal processors, or other digital processing circuits, along with associated program and data memory.

For example, in the illustration of FIG. 1, the apparatus comprises one or more processing circuits that are configured to implement precoding feedback as taught herein, and those one or more processing circuits may be at least partly implemented using programmable digital processing circuits. In a particular example, the processing circuits of the apparatus include signal quality/channel estimation circuit(s) 120, for estimating received signal quality and/or channel conditions. The processing circuits may further include a precoding feedback generation circuit 130, e.g., processing logic configured to generate/send precoding feedback, including frequency-dependent precoder update reports. Of course, these circuits may be so configured based on the execution of stored computer program instructions. In that regard, it will be appreciated that these processing circuits are specially adapted or otherwise configured to carry out the processing disclosed herein, irrespective of whether they comprise fixed or programmable circuitry, or any mix thereof.

Figure 5:
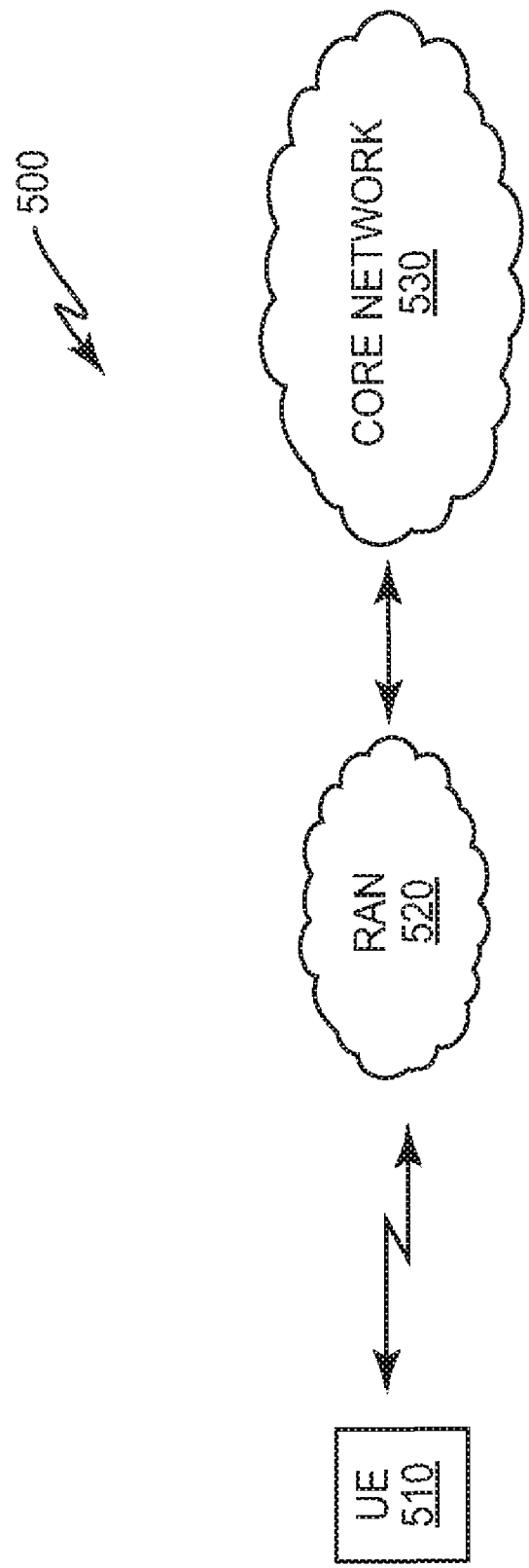
FIG. 5 illustrates an embodiment of a wireless communication network.

FIG. 5 illustrates an example wireless communication network 500. The illustration depicts a User Equipment (UE) 510 supported by a Radio Access Network (RAN) 520 and, in turn, by a Core Network (CN) 530. For example, the UE 510 generates precoder feedback, including frequency-dependent precoder update reports, which are used, for example, at a supporting network transceiver. In one example, the supporting network transceiver is an LTE or LTE-Advanced eNB.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the embodiments described herein are not limited by the foregoing description, nor are they limited by the accompanying drawings. Instead, the embodiments described herein are limited only by the following claims and their legal equivalents.

What is claimed is:

1. A method in a network node of generating a precoder for an effective channel linking a wireless receiver to a wireless transmitter, the effective channel including a propagation channel, transmit filters and receive filters, the method comprising:
   determining a structured frequency-selectivity of the effective channel, the structured frequency-selectivity induced by one or more long term and/or persistent parameters of the effective channel;
   generating a precoder update report based on the structured frequency-selectivity, the precoder update report including frequency-dependent phase compensation which accounts for the structured frequency-selectivity;
   generating a precoder report for the effective channel based on channel state information determined for the effective channel; and
   transmitting the precoder report and the precoder update report to the wireless transmitter.

2. The method of claim 1, comprising:
   determining a precoder matrix for subcarriers of the effective channel; and
   augmenting the precoder matrix with the frequency-dependent phase compensation.

3. The method of claim 2, comprising augmenting the precoder matrix with a diagonal matrix including the frequency-dependent phase compensation as entries of a main diagonal.

4. The method of claim 1, wherein the wireless transmitter is a multi-antenna wireless transmitter, and the frequency-dependent phase compensation is a linearly changing phase rotation over frequency for each antenna of the multi-antenna wireless transmitter.

5. The method of claim 1, wherein pluralities of subcarriers are grouped into a first plurality of subbands, and on each of the plurality of subbands the precoder update report represents a static phase compensation.

6. The method of claim 1, wherein the wireless transmitter is a multi-antenna wireless transmitter having a plurality of transmit antennas, and the frequency-dependent phase compensation is determined based on relative phase shifts between the plurality of transmit antennas.

7. The method of claim 1, wherein the precoder report comprises a plurality of precoders, each precoder associated with a subband composed of a plurality of sub-carriers, and wherein each precoder of a subband is augmented by the frequency-dependent phase compensation of the precoder update report.

8. The method of claim 1, wherein the frequency-dependent phase-compensation is constrained to a finite alphabet.

9. The method of claim 1, wherein the wireless transmitter is a multi-antenna wireless transmitter having a plurality of transmit antennas, and the precoder update report is generated for a subset of the plurality of transmit antennas.

10. The method of claim 1, wherein a plurality of sites of calibrated transmit antennas are coupled to the wireless transmitter, and the frequency-dependent phase compensation is determined for the plurality of sites of calibrated transmit antennas.

11. The method of claim 1, comprising:
   determining a channel response of the effective channel, the channel response accounting for the precoder update report;
   determining a precoder of the precoder report from a multi-granular codebook; and
   matching the precoder to the channel response.

12. The method of claim 1, further comprising:
   determining channel quality information based in part on the precoder report and the precoder update report so that the channel quality information indicates the largest transport format supportable by the effective channel if the precoder report and the precoder update report are utilized at the wireless transmitter; and
   sending the channel quality information to the wireless transmitter.

13. The method of claim 1, comprising:
calculating a channel response of the effective channel;
searching a codebook for a precoder that accounts for the precoder update report and most closely matches the channel response;
determining a new channel quality estimate based on the channel response and the precoder; and
sending the new channel quality estimate to the wireless transmitter.

14. The method of claim 1, wherein the network node is the wireless receiver coupled to the wireless transmitter over the effective channel.

15. A network node comprising:
a signal quality estimator circuit operable to determine channel state information for an effective channel linking a wireless receiver to a wireless transmitter, the effective channel including a propagation channel, transmit filters and receive filters, the signal quality estimator circuit further operable to determine a structured frequency-selectivity of the effective channel, the structured frequency-selectivity induced by one or more long term and/or persistent parameters of the effective channel;
a precoding generator circuit operable to generate a precoder report for the effective channel based on the channel state information, and a precoder update report based on the structured frequency-selectivity, the precoder update report including frequency-dependent phase compensation that accounts for the structured frequency-selectivity; and
a transceiver circuit operable to transmit the precoder report and the precoder update report to the transmitter.

16. The network node of claim 15, wherein the precoding generator circuit is operable to determine a precoder matrix for subcarriers of the effective channel and augment the precoder matrix with the frequency-dependent phase compensation.

17. The network node of claim 16, wherein the precoding generator circuit is operable to augment the precoder matrix with a diagonal matrix including the frequency-dependent phase compensation as entries of a main diagonal.

18. The network node of claim 15, wherein the wireless transmitter is a multi-antenna wireless transmitter, and the precoding generator circuit is operable to determine the frequency-dependent phase compensation based on relative phase shifts between a plurality of transmit antennas of the multi-antenna wireless transmitter.

19. The network node of claim 15, wherein the precoding generator circuit is operable to determine a separate precoder for each subband of the effective channel and augment each separate precoder with the frequency-dependent phase compensation determined for the corresponding subband.

20. The network node of claim 15, wherein the wireless transmitter is a multi-antenna wireless transmitter having a plurality of transmit antennas, and the precoding generator circuit is operable to determine the precoder update report for a subset of the plurality of transmit antennas.

21. The network node of claim 15, wherein a plurality of sites of calibrated transmit antennas are coupled to the wireless transmitter, and the precoding generator circuit is operable to determine the frequency-dependent phase compensation for the plurality of sites of calibrated transmit antennas.

22. The network node of claim 15, wherein the signal quality estimator able to determine a channel response of the effective channel that accounts for the precoder update report, and wherein the precoding generator circuit is operable to determine a precoder of the precoder report from a multi-granular codebook and match the precoder to the channel response.

23. The network node of claim 15, wherein the signal quality estimator circuit is operable to determine channel quality information based in part on the precoder report and the precoder update report so that the channel quality information indicates the largest transport format supportable by the effective channel if the precoder report and the precoder update report are utilized at the wireless transmitter, and wherein the transceiver circuit is operable to send the channel quality information to the wireless transmitter.

24. The network node of claim 15, wherein the preceding generator circuit is operable to search a codebook for a precoder that accounts for the precoder update report and most closely matches a channel response of the effective channel, wherein the signal quality estimator circuit is operable to determine the channel response of the effective channel and determine a new channel quality estimate based on the channel response and the precoder, and wherein the transceiver circuit is operable to send the new channel quality estimate to the wireless transmitter.

25. The network node of claim 15, wherein the network node is the wireless receiver coupled to the wireless transmitter over the effective channel.

26. A network node linked to a wireless receiver via an effective channel that includes a propagation channel, transmit filters and receive filters, the network node comprising:
a transceiver circuit operable to receive a precoder report and a precoder update report for the effective channel, the precoder report based on channel state information for the effective channel, the precoder update report based on a structured frequency-selectivity of the effective channel which is induced by one or more long term and/or persistent parameters of the effective channel, the precoder update report including frequency-dependent phase compensation that accounts for the structured frequency-selectivity; and
a preceding processor circuit operable to determine a transmission operation based on the precoder report and the precoder update report and transmit data to the wireless receiver n accordance with the transmission operation.

27. The network node of claim 26, wherein the transceiver circuit is operable to receive channel quality information for the effective channel, the channel quality information indicating the largest transport format supportable by the effective channel if the precoder report and the precoder update report are applied at the network node, and wherein the recoding processor circuit is operable to implement the transport format indicated by the channel quality information.

28. The network node of claim 26, wherein the precoder report and the precoder update report comprise a precoder matrix for subcarriers of the effective channel augmented with the frequency-dependent phase compensation.

29. A method in a network node of transmitting data to a wireless receiver over an effective channel including a propagation channel, transmit filters and receive filters, the method comprising:
receiving a precoder report and a precoder update report for the effective channel, the precoder report based on channel state information for the effective channel, the precoder update report based on a structured frequency-selectivity of the effective channel which is induced by one or more long term and/or persistent parameters of the effective channel, the precoder update report including frequency-dependent phase compensation that accounts for the structured frequency-selectivity;

determining a transmission operation based on the precoder report and the precoder update report; and transmitting data to the wireless receiver in accordance with the transmission operation.

30. The method of claim 29, comprising:

receiving channel quality information for the effective channel, the channel quality information indicating the largest transport format supportable by the effective channel if the precoder report and the precoder update report are applied at the network node; and implementing the transport format indicated by the channel quality information.

31. The method of claim 29, wherein the precoder report and the precoder update report comprise a precoder matrix for subcarriers of the effective channel augmented with the frequency-dependent phase compensation.

* * * * *